Oct. 25, 1927.

E. E. MINARD

COLLET 1,646,926

Filed Feb. 23, 1926

Inventor
Ernest E. Minard,

Attorneys

Patented Oct. 25, 1927.

1,646,926

UNITED STATES PATENT OFFICE.

ERNEST E. MINARD, OF DETROIT, MICHIGAN.

COLLET.

Application filed February 23, 1926. Serial No. 89,919.

In my pending application Serial No. 22,794, filed April 13, 1925, there is disclosed a feed collet used in automatic and hand operated screw machines, bar forming machines and the like for feeding stock so that an end portion of the stock may be operated upon for the production of screws and other articles. The feed collet is adapted to intermittently advance stock and a well known type of collet includes resilient fingers formed from a tubular piece of material. The resilient fingers disclosed in my pending application are provided with interchangeable pads or gripping jaws having lugs extending outwardly into the fingers, and this invention aims to provide somewhat of a reverse arrangement, that is providing the fingers with inwardly projecting lugs or the equipment thereof adapted to engage in the pads or gripping jaws. I have found that time and labor may be saved by providing the resilient fingers with pad retaining means, consequently a cheaper article of manufacture is produced that has all, if not more, advantage of the lug equipped pads disclosed in my pending application.

My invention will be hereinafter described and then claimed, and reference will now be had to the drawing, wherein Figure 1 is a longitudinal sectional view of a form of collet having pads held by finger lugs, the fingers and pads being illustrated as though holding a piece of stock shown by dot and dash lines;

Figures 1, 2:
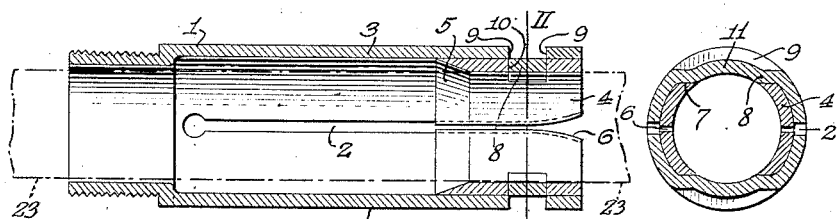
Fig. 2 is a cross sectional view taken on the line II—II of Fig. 1.
Figures 11, 12, 13:
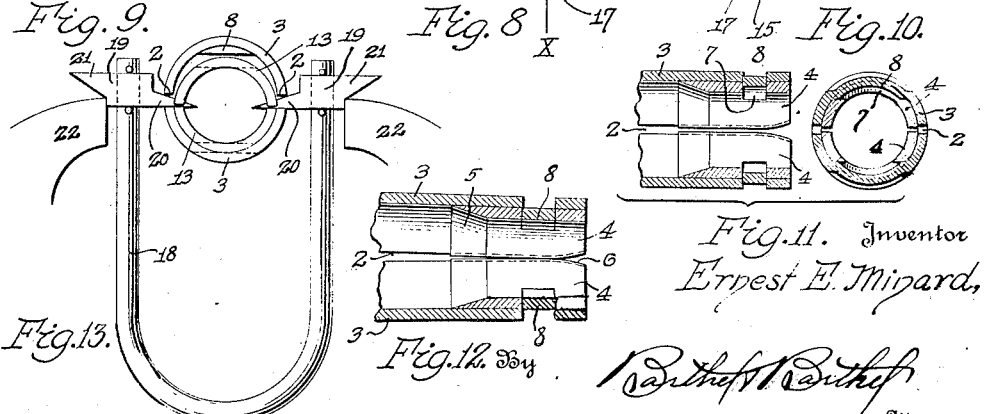
Fig. 11 shows sectional views of another form of collet.
Fig. 12 is a longitudinal sectional view of a portion of a collet similar to Fig. 1 showing the collet devoid of a piece of stock and the pad contacting.
Fig. 13 is an elevation of a tool that may be advantageously used in the removal of pads from a collet.

Reference will first be had to Figs. 1 to 4 inclusive, and Fig. 12 wherein 1 denotes a collet adapted to be placed in a machine and reciprocated therein to intermittently feed a piece of stock 23 extending through the collet. For this purpose the collet is formed from a cylindrical body or tube which is longitudinally slitted, as at 2 to provide opposed resilient semi-cylindrical fingers 3. Mounted in the outer end of the collet are opposed semi-cylindrical pads 4 having inner beveled ends 5 to permit of the forward end of the piece of stock 23 easily encountering said pads, and the outer ends of the pads and the fingers 3 have beveled edges 6 to afford clearance and permit of the pads contacting, as shown in Fig. 12. This contacting of the pads, at a point intermediate the ends thereof, will prevent the pads from tilting relative to each other and will maintain a snug engagement of the pad walls with the finger walls so that burrs or other matter cannot enter or wedge between the inner ends of the pads and the fingers, which in time might cause displacement of the pads. To hold the pads 4 in place against longitudinal displacement by a piece of stock, said pads have transverse slots 7 and extending into said slots are inwardly struck lugs 8 of the fingers 3. The lugs 8 are formed by providing the fingers 3, adjacent the outer ends thereof, with parallel transverse slits 9 and the material between said slits is struck inwardly to form the transverse lugs 8 which have abrupt side shoulders 10 disposed at approximately a right angle to the longitudinal axis of the collet. As shown in Fig. 2 the abrupt shoulders 10 are adapted to engage similar shoulders or side walls of the pad slots 7 and in order that the lugs 8 will snugly fit in the pads and not interfere with the movement of stock between the pads, the lugs have central arcuated portions 11 so that the inner walls of said lugs will cooperate with the inner walls of the pads 4 in providing a cylindrical end passage for the collet. In other words, the inner walls of the lugs 8 are flush with the inner walls of the pads, as best shown in Fig. 2, and the arcuated portions 11 of said lugs afford a better distribution of the metal to prevent displacement of the side walls of the collet fingers. In some instances, as shown in Fig. 11, the lugs 8 may not completely fill the slot 7 of the pads 4, but may span the joint between the pads and fingers, thus giving the lugs a firmer position, so that a pad, under endwise pressure on a piece of stock, cannot sever a lug from its finger. Obviously the side shoulders 10 of the lugs are braced throughout their length, in addition to the end connections with the fingers.

Figures 3, 4:
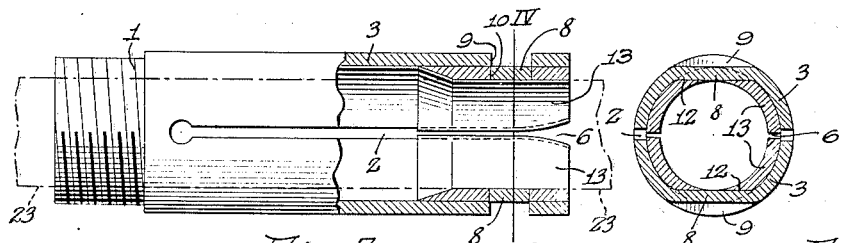
Fig. 3 is a side elevation, partly broken away and partly in section, of a collet having pads held somewhat similar to the pads shown in Figs. 1 and 2.
Fig. 4 is a cross sectional view taken on the line IV—IV of Fig. 3.

Instead of providing the lugs 8 with arcuated portions, said lugs may be straight, as shown in Figs. 3 and 4 in which instance the slots 12 in the pads 13 are of less depth than the slots 7 in the pads 4, consequently the side area of the finger lugs shown in Fig. 4, will less than the side area of the finger lugs shown in Fig. 2. One has a greater pad retaining power than the other but both are practical for lugs instruck from the collet fingers.

Figures 5, 6, 7:
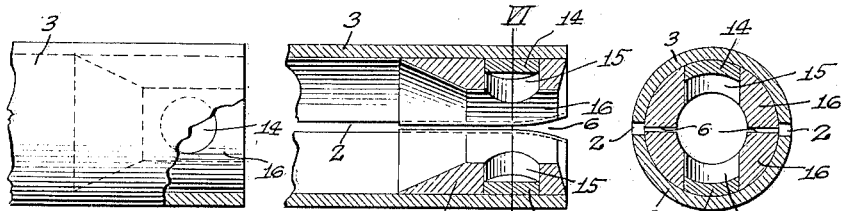
Fig. 5 is a longitudinal sectional view of a portion of another form of collet, showing the pads as though separated by a piece of stock.
Fig. 6 is a cross sectional view taken on the line VI—VI of Fig. 5.
Fig. 7 is a plan of a portion of the collet shown in Figs. 5 and 6.
Figures 8, 9, 10:
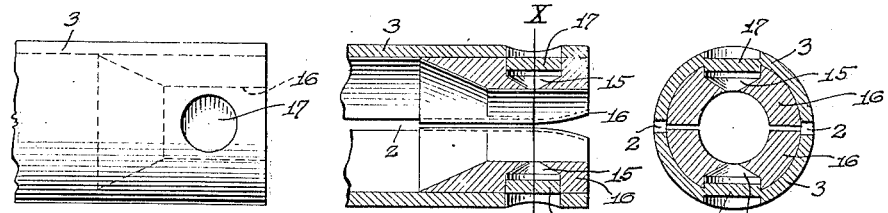
Fig. 8 is a longitudinal sectional view of a portion of still another form of collet showing the pads as though separated by a piece of stock.
Fig. 9 is a plan of the same.
Fig. 10 is a cross sectional view taken on the line X—X of Fig. 8.

In Figs. 5, 6 and 7 the collet fingers 3 are provided with inwardly projecting lugs 14 which may be spot welded to the inner walls of the fingers 3 and extend into openings 15 provided therefor in pads 16. Instead of making the lugs 14 independent of the collet fingers 3 and then connecting the lugs to said fingers I may punch or otherwise operate upon the collet fingers 3 to provide instruck lugs 17, as shown in Figs. 8, 9, and 10. The lugs 14 and 17 are preferably cylinderical and are simply instances of other forms of lugs than those disclosed in Figs. 1 to 4 inclusive. In all forms the lugs prevent accidental displacement of the pads, yet permit of the pads moving inwardly towards each other and removal of said pads from the fingers.

In Fig. 13 I show a tool that may be advantageously used for removing the pads when necessary. This tool comprises a U-shaped resilient holder 18 provided with heads 19 having wedge members 20 and wedge members 21, the wedge members 20 being more acute than the wedge members 21. I show the small wedge members as entering the slits 2 of the collet to force the collet fingers apart and for this purpose the tool may be placed between the vise jaws 22 and supported thereon while the jaws are adjusted towards each other to force the wedge members inwardly to spring the fingers apart. The uppermost pad may drop on to the lower pad to clear the upper lug and then the uppermost pad may be shifted outwardly from the end of a collet. The lowermost pad can then be raised and easily removed from the end of the collet. This ready removal of the collet pads is a feature of my invention which facilitates operations and production in connection with a screw machine, and the fact that the pads are positively held against longitudinal displacement and against turning or tilting movement relative to the collet fingers prevents, to a large degree, the accumulation of any burrs, chips or the like between the pads and the collet fingers and obviates any particular attention or care of the pads until the same may be worn and need replacing.

From the foregoing it will be observed that I have illustrated the collet as though the fingers were stressed and a piece of stock extending therethrough. It will also be noted, that the mounting and demounting of the pads involves a method of procedure and for this reason I do not care to confine my invention to any details of construction, for carrying out the method, other than defined in the appended claims.

What I claim is:

1. A feed collet comprising fingers, pads, a connection between said fingers and pads, said connection being formed by portions having a configuration which prevents longitudinal and turning movement of said pads relative to said fingers and permits radial shifting of said pads towards each other at opposite sides of the axis of said collet without said pads becoming disconnected from said fingers.

2. A feed collet made of tubular material that may be struck outwardly, said collet comprising interengaging fingers and pads, the engagement between said fingers and pads being in the form of contacting shoulders with some of said shoulders outstruck from said fingers.

3. A feed collet made of tubular material that may be struck inwardly, said collet comprising fingers, pads against the inner walls of said fingers and free to move inwardly towards each other, and means struck inwardly from said fingers to engage in said pads and prevent longitudinal or turning movement of said pads relative to said fingers.

4. A collet comprising spaced apart fingers, pads against the inner walls of said fingers, means carried by said fingers and extending into said pads to prevent longitudinal movement of said pads relative to said fingers, said means spanning a joint between said pads and fingers so that there is a constant interengagement of said fingers and pads.

In testimony whereof I affix my signature.

ERNEST E. MINARD,